United States Patent [19]

Kubota

[11] Patent Number: 5,219,522

[45] Date of Patent: Jun. 15, 1993

[54] METHOD OF PRODUCING A SUBSTANCE UTILIZING AGRAVIC EFFECT AND AN APPARATUS FOR CARRYING OUT SAME

[76] Inventor: Masao Kubota, 22-7, Narimasu 2-chome, Itabashi-ku, Tokyo, Japan

[21] Appl. No.: 465,194

[22] PCT Filed: Jun. 28, 1989

[86] PCT No.: PCT/JP89/00646

§ 371 Date: Feb. 20, 1990

§ 102(e) Date: Feb. 20, 1990

[87] PCT Pub. No.: WO90/00084

PCT Pub. Date: Jan. 11, 1990

[30] Foreign Application Priority Data

Jun. 28, 1988 [JP] Japan .................................. 63-158117
Jun. 26, 1989 [JP] Japan .................................. 1-160896

[51] Int. Cl.⁵ .............................................. C22C 1/00
[52] U.S. Cl. .................................. 420/590; 75/10.67; 266/173
[58] Field of Search .................. 266/173; 75/10.67; 420/590

[56] References Cited

U.S. PATENT DOCUMENTS 3,764,296 10/1973 Gerlach ......................... 75/10.67
4,071,229 1/1978 Domazer ......................... 266/123
4,245,821 1/1981 Kappell ........................... 266/173
4,462,793 7/1984 Maeda ............................. 266/173
4,547,220 10/1985 Carpenter ........................ 266/173

Primary Examiner—Peter D. Rosenberg
Attorney, Agent, or Firm—Merchant, Gould, Smith, Edell, Welter & Schmidt

[57] ABSTRACT

A method of producing a substance utilizing an agravic effect, and an apparatus for carrying out the same. A container (3, 55, 65) containing materials for producing a substance is revolved about a horizontal axis, at least while a process of producing the substance is in progress, so as to meet an inequality:

$$|\omega| \leq \sqrt{x \cdot g/r} \text{ (radian/sec)}$$

where (radian/sec) is the angular velocity of the container, g (mm/s²) is gravitational acceleration, r (mm) is the distance between a unit mass and an axis of rotation of the container rotating about its own axis to generate a residual centrifugal force acting on the unit mass, and x is the upper limit of the ratio between centrifugal force acting on the unit mass at each cycle and the terrestrial gravity (gravitational acceleration g).

3 Claims, 4 Drawing Sheets

METHOD OF PRODUCING A SUBSTANCE UTILIZING AGRAVIC EFFECT AND AN APPARATUS FOR CARRYING OUT SAME

TECHNICAL FIELD

The present invention relates to a method of producing a substance utilizing an agravic effect, and an apparatus for carrying out the same, and more particularly, to a method of producing a substance, such as an alloy having a homogeneous alloy composition and structure consisting of a plurality of elements each having a different specific gravity, in an agravic environment created by nullifying terrestrial gravitation instead of a microgravitational environment created by utilizing an artificial satellite or a deep shaft, and an apparatus for carrying out such a method. This method and apparatus are applicable also to various industrial purposes utilizing an agravic effect other than producing alloys.

BACKGROUND ART

It has been considered that an agravic environment cannot be created in any way other than by creating an agravic environment in an artificial satellite or an aircraft in an agravic sphere, or allowing objects, for example, a mixture of the component substances of an alloy, to fall into a deep shaft, such as a pit in an abandoned mine. A huge amount of money has been invested in the development of means for creating an agravic environment, but the great expense incurred by this development is reflected directly by the cost of products manufactured by such a costly means. Accordingly, there is a demand for the development of a method of creating an agravic environment at an economically acceptable cost, and for an economically feasible apparatus for creating an agravic environment.

DISCLOSURE OF THE INVENTION

Accordingly, an object of the present invention is to provide a method and an apparatus able to meet such a demand.

Another object of the present invention is to nullify the effects of gravity, while evaluating the diverse effects accompanying this nullification of gravity, and to create an agravic environment having an appropriate range.

The present invention provides a method of producing a substance utilizing an agravic effect, characterized in that a container containing a mixture of materials is revolved about a horizontal axis, at least during the progress of changes in the materials, at an angular velocity $\omega$ (rad/s) meeting an inequality:

$$|\omega| \leq \sqrt{x \cdot g/r}$$

where g (mm/s$^2$) denotes the gravitational acceleration, r (mm) the distance between a portion of the materials subject to the effect of a residual centrifugal force acting thereon at every cycle, and an axis of rotation of the container rotating about its own axis, and x the upper limit of the ratio between the residual centrifugal force acting on the portion of the materials and the terrestrial gravitation (gravitational acceleration g).

To carry out the foregoing method, in accordance with one aspect of the present invention, an apparatus for producing a substance utilizing an agravic effect comprises a bearing housing fixedly set on the ground, a bearing provided on the housing, a rotary shaft supported for revolution in one direction in the bearing, a container mounted on the rotary shaft with the center of materials contained therein on the axis of the rotary shaft, and a mechanism for revolving the rotary shaft in one direction at an angular velocity meeting the aforesaid inequality.

In accordance with another aspect of the present invention, an apparatus for producing a substance utilizing an agravic effect comprises two parallel, horizontal axes, two rotary members respectively having pitch circles at which the same tangential speed is obtained, mounted respectively on the two horizontal axes to be revolved respectively in opposite directions and each having a station, a container for containing the materials for producing the substance, capable of being detachably mounted on the station, a mechanism for transferring the container from one of the rotary members to the other, and vice versa, upon a coincidence of the center of the materials contained in the container with the point of contact of the pitch circles of the rotary members, and a mechanism for revolving the container at an angular velocity meeting the aforesaid inequality.

Assuming that an objective substance is, for example, an alloy, then when a mixture of the powdery component elements of the alloy is heated in an induction heating furnace to melt the component elements, even the heavy molten component elements take a comparatively long time to subside, because the molten mixture has a high viscosity. Accordingly, when the container containing the molten mixture is revolved, an uneven subsidence of the molten elements attributable to the difference in the specific gravity of the elements rarely occurs within a short time. To utilize such an effect, the container filled with a mixture of the materials of the alloy and mounted on the rotary member is revolved at the highest practically possible revolving speed, and the container is transferred from one rotary member to the other so that the molten mixture is alternately subjected to centrifugal forces acting respectively in opposite directions on the molten mixture. When the container is revolved about an horizontal axis, the position of the container varies continuously through an angle of 360°, so that the effect of gravity on the molten mixture is nullified, provided that the time delay is ignored, and consequently, an alloy of a homogeneous quality can be produced.

The centrifugal force acting on a particle of a mass m at a distance r from the center of rotation is $m \cdot r \cdot \omega^2$ ($\omega$ is the angular velocity). Accordingly, when the container is transferred from one of the rotary members to the other, to cancel out the effect of the centrifugal force acting on the molten mixture when the container is on the former rotary member and that of the centrifugal force acting on the molten mixture when the container is on the latter rotary member, the influence of the centrifugal force on the structure of the alloy may be eliminated or reduced. The middle point P of a straight line connecting the respective centers $O_1$ and $O_2$ of the rotary members is the point of contact of the respective pitch circles of the rotary members, i.e., the position of the center of revolution of the container at which the direction of revolution of the container changes. The container can be smoothly transferred from one of the rotary members to the other when the container is transferred from the former rotary member to the latter rotary member upon a coincidence of the center of the container with the point P, and the effect of the centrifugal force acting on the center of the container in one direction and that of the centrifugal force acting on the same in the opposite direction are cancelled out, and the effect of the centrifugal forces is completely nullified. Although portions of the molten mixture in the vicinity of the center of the container are subject to the effect of centrifugal force generated by the rotation of the container about its own axis, a range in which the effect of such centrifugal force can be limited to a practically allowable degree (an elongated portion near the center of a furnace) may be used without problem. Even if the amount of a good quality substance produced in a batch in one agravic process is small, the small pieces of the substance produced through a plurality of the agravic processes may be collected in a large mass by a process such as a vacuum heating process.

BRIEF DESCRIPTION OF THE DRAWINGS

The above and other objects, features and advantages of the present invention will become apparent from the following description taken in conjunction with the accompanying drawings, in which.

BEST MODE OF CARRYING OUT THE INVENTION

Figure 1:
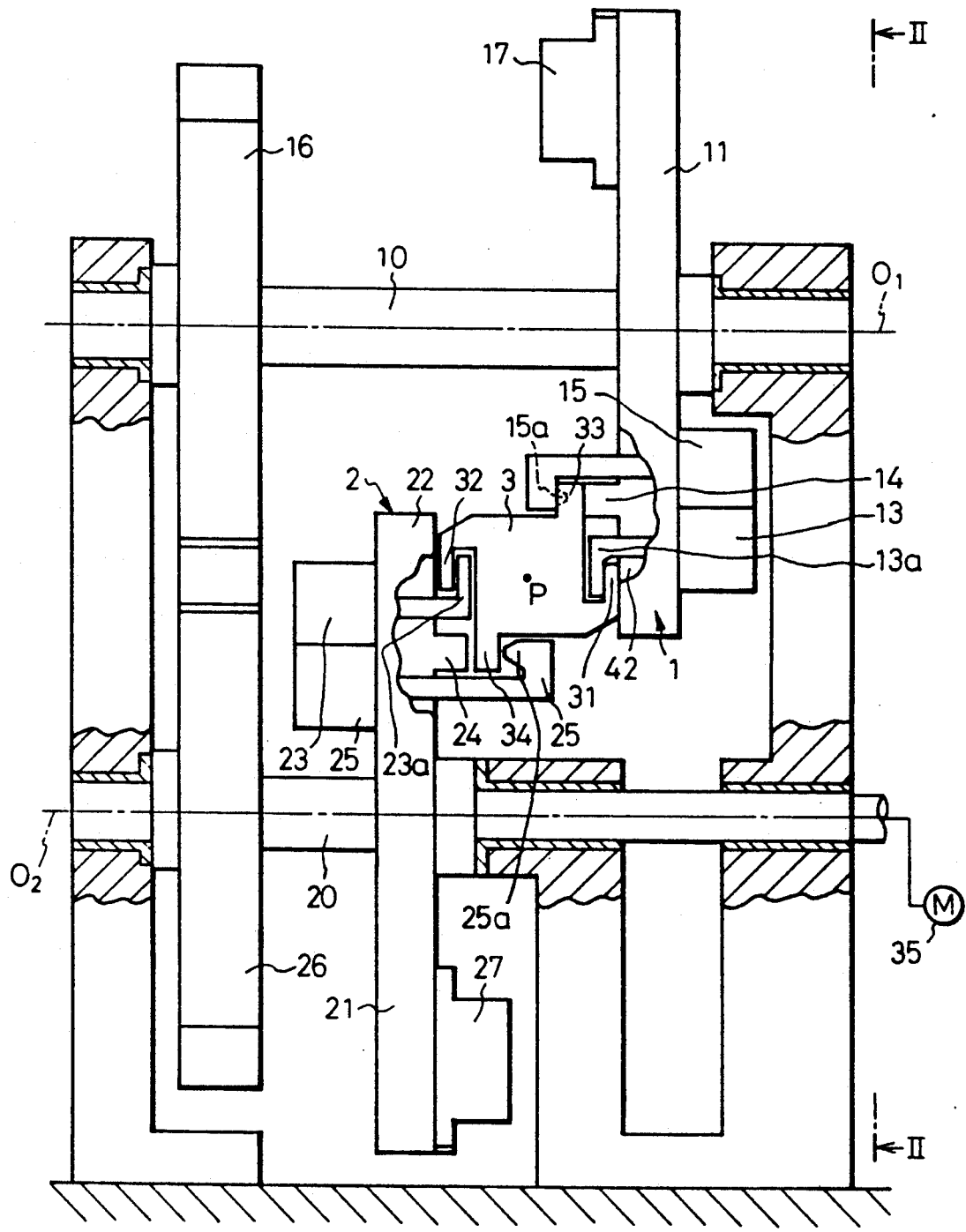
FIG. 1 is a front elevation of an apparatus for producing a substance utilizing an agravic effect in a first embodiment according to the present invention.
Figure 2:
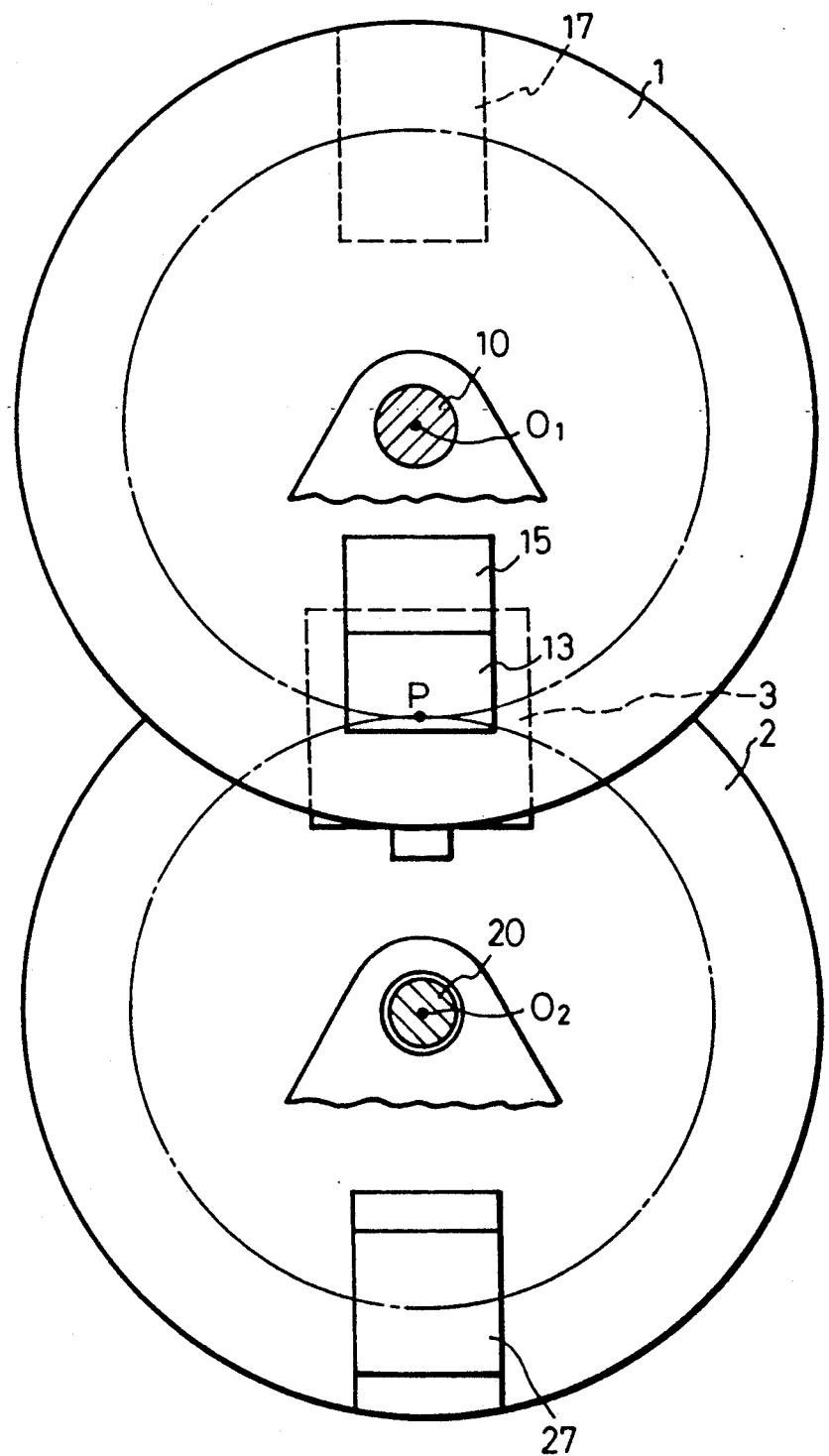
FIG. 2 is a side elevation taken in the direction of the arrowed line II—II in FIG. 1.

Referring to FIGS. 1 and 2, an apparatus as a first embodiment according to the present invention has an upper rotary unit 1 and a lower rotary unit 2 each having a station, respectively, between which a container 3 containing objective materials is transferred from one to the other, and vice versa. The upper rotary unit 1 comprises, as principal components, a rotary shaft 10 having a horizontal axis of revolution $O_1$, a disk 11 attached to the rotary shaft 10, a right-hand support 12 for supporting the container 3, a flat main clamping unit 13 having a clamping finger 13a and operated by, for example, hydraulic means, a right-hand auxiliary support 14, an auxiliary clamping unit 15 provided with a taper pin 15a and operated by, for example, hydraulic means, a drive gear 16, and a balance weight 17. The lower rotary unit 2 comprises, as principal components, a rotary shaft 20 having a horizontal axis of revolution $O_2$, a disk 21 attached to the rotary shaft 20, a left-hand support 22, a flat main clamping unit 23 having a clamping finger 23a, a left-hand auxiliary support 24, an auxiliary clamping unit 25 provided with a taper pin 25a, a driving gear 26, and a balance weight 27. The container 3 is provided internally with a fusion furnace for melting the materials of an alloy, and has L-shaped extensions 31 and 32 and flat extensions 33 and 34 respectively corresponding to the supports 12 and 22. The container 3 is transferred from the upper rotary unit 1 to the lower rotary unit 2, and vice versa, in the vicinity of the middle point P of a straight line connecting the axes $O_1$ and $O_2$ as viewed in FIG. 2, so that the container 3 travels along a path having the shape of an Arabic numeral 8. The rotary shafts 10 and 20 are revolved by an electric motor M connected to, for example, one end of the rotary shaft 20 through a suitable reduction gear, not shown.

When transferring the container 3 from the upper rotary unit 1 to the lower rotary unit 2, the auxiliary clamping unit 15 is unfastened immediately before the arrival of the center of the container 3, carried by the upper rotary unit 1, at the middle point P, the main clamping unit 13 is unfastened, and at the same time, the main clamping unit 23 is actuated at the moment of arrival of the center of the container 3 at the middle point P, and then immediately after the actuation of the main clamping unit 23, the auxiliary clamping unit 25 is actuated. During the transfer of the container 3 from the upper rotary unit 1 to the lower rotary unit 2, the gap between the taper pin 15a of the auxiliary clamping unit 15 and a corresponding taper hole formed in the flat extension 33 prevents interference between the container 3 and the rotary units 1 and 2. The weight of the balance weights 17 and 27 is approximately half the gross weight of the container 3, so that the unbalanced weight of the rotary units 1 and 2 is limited to about half the gross weight of the container 3.

In the above-mentioned embodiment, a calculated centrifugal force for a simple condition residually acting on a mass m at a point Q at a distance $r_p$ from the point P is $m \cdot r_p \cdot \omega^2$.

When the cycle of rotation of the disks 11 and 21 is 4 sec, the angular velocity $\omega = \pi$ rad/s. Therefore, when $r_p = 1$ mm, the residual centrifugal force is approximately 0.001 times the gravity (mg), and such a centrifugal force is practically satisfactory. Although it is possible to provide the rotary units 1 and 2 with a plurality of stations for mounting a plurality of containers on the disks 11 and 21, and to rotate the disks 11 and 21 at a reduced angular velocity, such a configuration is not necessarily advantageous because the cycle for each container is increased and the apparatus requires a complex control operation. When the rotary units 1 and 2 are provided with a plurality of stations, however, and a plurality of containers are mounted on the stations, the efficiency of the apparatus is increased accordingly because the plurality of containers are subjected to processing, provided that the containers are small, the radius of revolution $\overline{O_1P}$ ($=\overline{O_2P}$) is not increased and the angular velocity $\omega$ is not changed; namely, the cycle is not changed. In either configuration, the container 3 rotates about its own axis alternately through an angle of 360° when the container revolves once about the horizontal axis of revolution $O_1$ and an angle of $-360°$ when the container 3 revolves about the horizontal axis of revolution $O_2$. Accordingly, a current necessary for producing the substance can be supplied from an external power supply to the container 3 through a flexible electro-conductive wires without employing slip rings or the like.

As stated above, the substance can be used in a large mass, even if only a small piece of the substance can be produced at each production cycle, by collecting the small pieces of the substance by a vacuum heating process.

The foregoing apparatus embodying the present invention is comparatively simple in construction, is inexpensive, and is capable of nullifying the influence of gravity to a practically allowable degree. The agravic effect exerted by the apparatus on the materials of the substance is substantially equivalent to an agravic effect available in an agravic environment acquired by a very expensive artificial satellite or a deep shaft. Thus, the present invention enables the production of a product, such as an alloy or the like, of a quality substantially equivalent to that of a product produced in an agravic environment, at a remarkably reduced cost.

Figure 3:
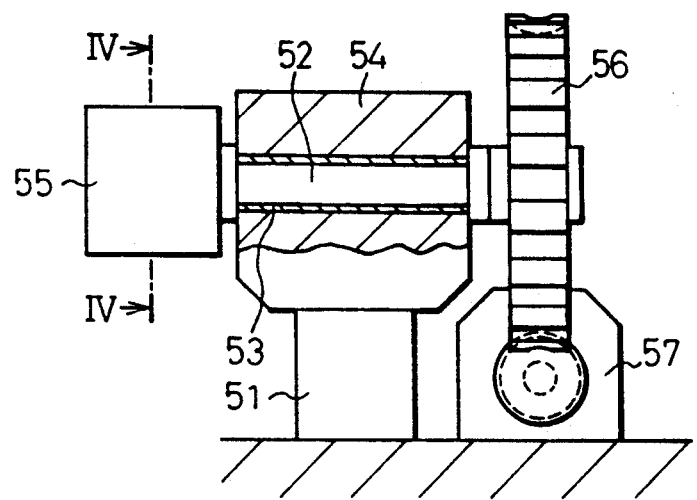
FIG. 3 is a schematic front elevation of an apparatus for producing a substance utilizing an agravic effect in a second embodiment according to the present invention.
Figure 4:
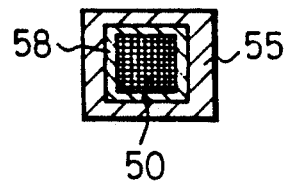
FIG. 4 is a sectional view taken along the line IV—IV in FIG. 3.

FIGS. 3 and 4 show an apparatus in a second embodiment according to the present invention. Referring to FIGS. 3 and 4, a bearing housing 52 is mounted on a bed 51, and a horizontal shaft 54 is supported for rotation in a bearing 53 held on the bearing housing 52. A container 55 is attached to the left end, as viewed in FIG. 3, of the horizontal shaft 54. A vessel 58 containing materials 50 is contained in the container 55. The container 55 is a box-shaped device, for example, a fusion furnace, for producing a product, such as an alloy, by processing elements contained in the vessel 58 by heating and cooling devices, not shown.

The worm wheel of a worm gear 56 is attached to the right end of the horizontal shaft 54, and the worm of the worm gear 56 is attached to the output shaft of an electric motor 57 to drive the horizontal shaft 54 for rotation through the worm gear 56 by the electric motor 57, to rotate the container 55. The container 55 is attached to the extremity of the horizontal shaft 54, with the horizontal center axis thereof in alignment with the center axis of the horizontal shaft 54. Accordingly, the container 55 rotates about the center axis of the horizontal shaft 54 when the horizontal shaft 54 is revolved.

The container 55 for containing the materials employed in the apparatus of FIGS. 3 and 4 is a typical container having a cubic shape.

Figure 5:
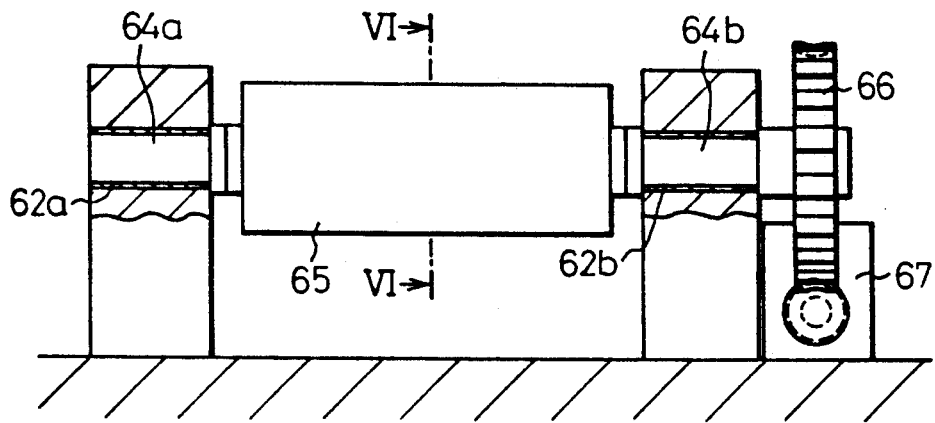
FIG. 5 is a schematic front elevation of a modification of the apparatus shown in FIGS. 3 and 4 for application to the production of an elongated material.
Figure 6:
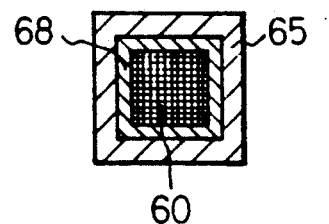
FIG. 6 is a sectional view taken along the line VI—VI in FIG. 5.

FIGS. 5 and 6 show an apparatus for producing a substance in an elongated shape, as a modification of the apparatus of FIGS. 3 and 4. The apparatus shown in FIGS. 5 and 6 comprises two beds 61a and 61b provided, respectively, with bearings 62a and 62b, two horizontal rotary shafts 64a and 64b supported for rotation, respectively, in the bearings 62a and 62b, and an elongated container 65 containing vessels for containing materials, and held between and on the horizontal rotary shafts 64a and 64b.

Either of the horizontal rotary shafts 64a and 64b, for example, the horizontal rotary shaft 64b is connected operatively through a worm gear 66 to an electric motor 67, as shown in FIG. 5, to revolve the horizontal rotary shafts 64a and 64b and the container 65 at a desired revolving speed. As shown in a cross-sectional view in FIG. 6, a vessel 68 is held within the container 65, and materials 60 are contained in the vessel 68. Naturally, the container 65 is supported on the horizontal rotary shafts 64a and 64b with the center axis thereof substantially in alignment with the axes of the horizontal rotary shafts 64a and 64b.

When revolving the container 55 containing the vessel 50 of the apparatus shown in FIGS. 3 and 4, or the container 65 containing the vessel 60 of the apparatus shown in FIGS. 5 and 6, the centrifugal force that acts on a particle of a mass m at a distance r from the center of rotation is $m \cdot r \cdot \omega^2$, where $\omega$ is the angular velocity of the particle, while the gravity that acts on the particle is $m \cdot g$ (g is gravitational acceleration mm/s$^2$). Therefore, to produce a centrifugal force not greater than x times the gravitation, an inequality:

$$m \cdot r \cdot \omega^2 \leq x \cdot m \cdot g \qquad (1)$$

must be satisfied. Therefore, $$n \leq (\pi/2) \cdot \sqrt{x \cdot g/r} \qquad (2)$$

where n (rps) is the revolving speed of the container 55 or 56. For example, when r=1 mm and x=0.001, n≦0.5 rps.

The apparatus embodying the present invention for producing a substance utilizing an agravic effect is comparatively simple in construction, is inexpensive, and is capable of exerting an agravic effect substantially equivalent to that obtained by using a very expensive artificial satellite or a deep shaft. Thus, the apparatus of the present invention can be advantageously applied to producing a substance utilizing an agravic environment.

I claim:
1. A method of producing a substance from materials contained in a container by applying a predetermined treatment to said materials while said materials are under an agravic effect, said method comprising:
revolving said container about a horizontal axis at least while a production of the substance from said materials is in progress;
maintaining the revolution of said container about said horizontal axis under a condition satisfying an inequality:

$$|\omega| \leq \sqrt{X \cdot g/r} \text{ (radian/second)}$$

where ω(rad/sec) is an angular velocity given to said container, g (mm/sec$^2$) is gravitational acceleration, r (mm) is a radial distance between a unit mass of said materials and an axis of rotation of said unit mass, and X is the upper limit of the ratio between a residual centrifugal force acting on said unit mass during each cycle of revolution and the terrestrial gravity (gravitational acceleration g); and,
taking the substance out of said container when the revolution of said container is stopped.

2. The method of producing a substance according to claim 1, wherein a central portion of said substance taken out of said container is derived as a final product by including the step of removing the rest of said substance around said central portion.

3. The method of producing a substance according to claim 3, wherein said materials comprise a plurality of metallic materials for an alloy, and said predetermined treatment includes the step of melting said plurality of metallic materials during said revolution of said container.

* * * * *

UNITED STATES PATENT AND TRADEMARK OFFICE
CERTIFICATE OF CORRECTION

PATENT NO. :   5,219,522
DATED      :   June 15, 1993
INVENTOR(S):   Masao Kubota It is certified that error appears in the above-identified patent and that said Letters Patent is hereby corrected as shown below:

Column 6, line 12, delete "$\pi/2$" and insert therefore --$1/2\pi$--.

Signed and Sealed this

Seventh Day of June, 1994

Attest:

BRUCE LEHMAN

Attesting Officer   Commissioner of Patents and Trademarks